(12) United States Patent
Suzuki et al.

(10) Patent No.: US 11,505,851 B2
(45) Date of Patent: Nov. 22, 2022

(54) ALUMINUM ALLOY, ALUMINUM ALLOY SPRING, AND FASTENING MEMBER MADE OF ALUMINUM ALLOY

(71) Applicant: NHK Spring Co., Ltd., Yokohama (JP)

(72) Inventors: Takeshi Suzuki, Kanagawa (JP); Junichi Nakano, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 196 days.

(21) Appl. No.: 16/955,425

(22) PCT Filed: Dec. 21, 2018

(86) PCT No.: PCT/JP2018/047360
§ 371 (c)(1),
(2) Date: Jun. 18, 2020

(87) PCT Pub. No.: WO2019/124554
PCT Pub. Date: Jun. 27, 2019

(65) Prior Publication Data
US 2021/0010111 A1   Jan. 14, 2021

(30) Foreign Application Priority Data

Dec. 22, 2017 (JP) .............................. JP2017-246849
Aug. 10, 2018 (JP) .............................. JP2018-151942

(51) Int. Cl.
*C22C 21/10* (2006.01)
*C22F 1/05* (2006.01)
(Continued)

(52) U.S. Cl.
CPC .............. *C22C 21/10* (2013.01); *C22F 1/053* (2013.01); *F16B 33/00* (2013.01); *F16F 1/021* (2013.01);
(Continued)

(58) Field of Classification Search
CPC ................................. C22C 21/10; C22F 1/053
See application file for complete search history.

(56) References Cited

U.S. PATENT DOCUMENTS

2004/0065173 A1   4/2004   Fritzemeier et al.
2010/0101748 A1   4/2010   Hata et al.
(Continued)

FOREIGN PATENT DOCUMENTS

CN   102876941 A     1/2013
EP     3343049 A1    7/2018
(Continued)

OTHER PUBLICATIONS

G. N. Melhem, "Aerospace Fasteners: Use in Structural Applications", Encyclopedia of Aluminum and Its Alloys, First Edition, Dec. 31, 2018, pp. 30-45. (cited in the Jun. 25, 2021 Search Report issued for EP18891392.5).
(Continued)

*Primary Examiner* — Jessee R Roe
(74) *Attorney, Agent, or Firm* — Locke Lord LLP; James E. Armstrong, IV; Nicholas J. DiCeglie, Jr.

(57) ABSTRACT

An aluminum alloy according to the present invention includes 1.2% by mass to 4.0% by mass of copper, 4.0% by mass to 14.0% by mass of zinc, 0.5% by mass to 4.0% by mass of magnesium, 0.01% or less of silicon, and 0.01% or less of iron, with the balance containing aluminum and inevitable impurities, and has an average equivalent circle crystal grain size of 500 nm or less.

4 Claims, 7 Drawing Sheets

(51) Int. Cl.
*C22F 1/053* (2006.01)
*F16B 33/00* (2006.01)
*F16F 1/02* (2006.01)
*B60G 21/055* (2006.01)
*F16F 1/06* (2006.01)
*F16F 1/18* (2006.01)

(52) U.S. Cl.
CPC ............. *B60G 21/055* (2013.01); *F16F 1/06* (2013.01); *F16F 1/18* (2013.01); *F16F 2224/0208* (2013.01); *F16F 2228/007* (2013.01)

(56) References Cited

U.S. PATENT DOCUMENTS

| | | | |
|---|---|---|---|
| 2011/0088510 A1* | 4/2011 | Pandey | ................. C22C 1/0416 419/23 |
| 2015/0218679 A1 | 8/2015 | Aruga et al. | |
| 2019/0136351 A1 | 5/2019 | Kaneko et al. | |

FOREIGN PATENT DOCUMENTS

| EP | 3778944 A1 | 2/2021 |
|---|---|---|
| JP | S60-86249 A | 5/1985 |
| JP | 03-294445 A | 12/1991 |
| JP | 2001-335874 A | 12/2001 |
| JP | 2009-13479 A | 1/2009 |
| JP | 2009-35766 A | 2/2009 |
| JP | 5343333 B2 | 11/2013 |
| JP | 5860371 B2 | 2/2016 |
| JP | 2016-141880 A | 8/2016 |
| JP | 2017-133097 A | 8/2017 |
| JP | 6356365 B2 | 7/2018 |
| WO | 2008/105303 A1 | 9/2008 |
| WO | 2014/046046 A1 | 3/2014 |

OTHER PUBLICATIONS

Supplementary European Search Report dated Jun. 25, 2021, issued for Euroepan Patent Application No. 18891392.5.
Office Action dated Mar. 30, 2021, issued for the corresponding Chinese patent application No. 201880083142.5 and English translation thereof.
Z. Horita et al.,"Equal-Channel Angular Pressing of Commercial Aluminum Alloys: Grain Refinement,Thermal Stability and Tensile Properties," Metallurgical and Materials Transactions A, vol. 31A, No. 3, Mar. 2000, p. 691-701 and information page (13 pages) (cited in the JP Office Action).
Office Action dated Jun. 11, 2019, issued for the JP Patent Application No. 2019-517104 and English translation thereof.
Z. Horita et al., "Improvement of mechanical properties for Al alloys using equal-channel angular pressing", Journal of Materials Processing Technology, 117, Nov. 23, 2001, pp. 288-292. (cited in the ISR and cited in the JP Office Action).
International Search Report dated Feb. 12, 2019, issued for PCT/JP2018/047360.

\* cited by examiner

ALUMINUM ALLOY, ALUMINUM ALLOY SPRING, AND FASTENING MEMBER MADE OF ALUMINUM ALLOY

FIELD

The present invention relates to an aluminum alloy, an aluminum alloy spring, and an aluminum alloy fastening member.

BACKGROUND

In recent years, for the purpose of reducing weight of various kinds of components in automobile use, electrical equipment, and other manufacturing fields in general, replacement of a ferrous material by an aluminum-based material, a resin, a fiber-reinforced resin, and the like has been studied. Out of the aluminum-based material, the resin, and the fiber-reinforced resin, in the aluminum-based material, use of a material made of an aluminum alloy has been studied. As this kind of aluminum alloy, a 6,000 series aluminum alloy excellent in balance between strength and elongation characteristics has been known (for example, see Patent Literature 1). However, the aluminum alloy disclosed in Patent Literature 1 has tensile strength of 690 MPa or less, and has been further required to have higher strength.

As an aluminum alloy having strength higher than that of the 6,000 series aluminum alloy described above, a 7,000 series aluminum alloy has been known (for example, see Patent Literature 2). Using the 7,000 series aluminum alloy enables a member having strength higher than that of a member made of the 6,000 series aluminum alloy to be created.

CITATION LIST

Patent Literature

Patent Literature 1: Japanese Patent No. 6356365
Patent Literature 2: Japanese Patent No. 5343333

SUMMARY

Technical Problem

However, the aluminum alloy disclosed in Patent Literature 2 has tensile strength of 785 MPa at a maximum, and the tensile strength does not reach the required higher strength. Furthermore, the components described above are also required to improve elongation characteristics in terms of improving mechanical properties.

In view of the foregoing, an object of the present invention is to provide an aluminum alloy that has high strength and elongation while reducing weight, a aluminum alloy spring, and a aluminum alloy fastening member.

Solution to Problem

To solve the above-described problem and achieve the object, an aluminum alloy according to the present invention includes: 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, wherein the aluminum alloy has an average equivalent circle crystal grain size of 500 nm or less.

Moreover, in the above-described aluminum alloy according to the present invention, the aluminum alloy has tensile strength of 780 MPa or more and breaking elongation of 12% or more.

Moreover, in the above-described aluminum alloy according to the present invention, the aluminum alloy is formed by being subjected to shearing work.

Moreover, an aluminum alloy spring according to the present invention is formed using the aluminum alloy according to the above-described invention.

Moreover, an aluminum alloy fastening member according to the present invention is configured to fasten a plurality of members, and formed using the aluminum alloy according to the above-described invention.

Advantageous Effects of Invention

The present invention may provide an aluminum alloy that has high strength and elongation while reducing weight, an aluminum alloy spring, and an aluminum alloy fastening member.

DESCRIPTION OF EMBODIMENTS

Embodiments for implementing the present invention will now be described in detail with reference to the accompanying drawings. It should be noted that the following embodiments are not intended to limit this invention. Each view referred to in the following description merely illustrates a shape, size, and positional relation schematically to the extent that contents of the present invention may be understood. In other words, the present invention is not limited to only the shape, the size, and the positional relation illustrated in each view.

First Embodiment

Figure 1:
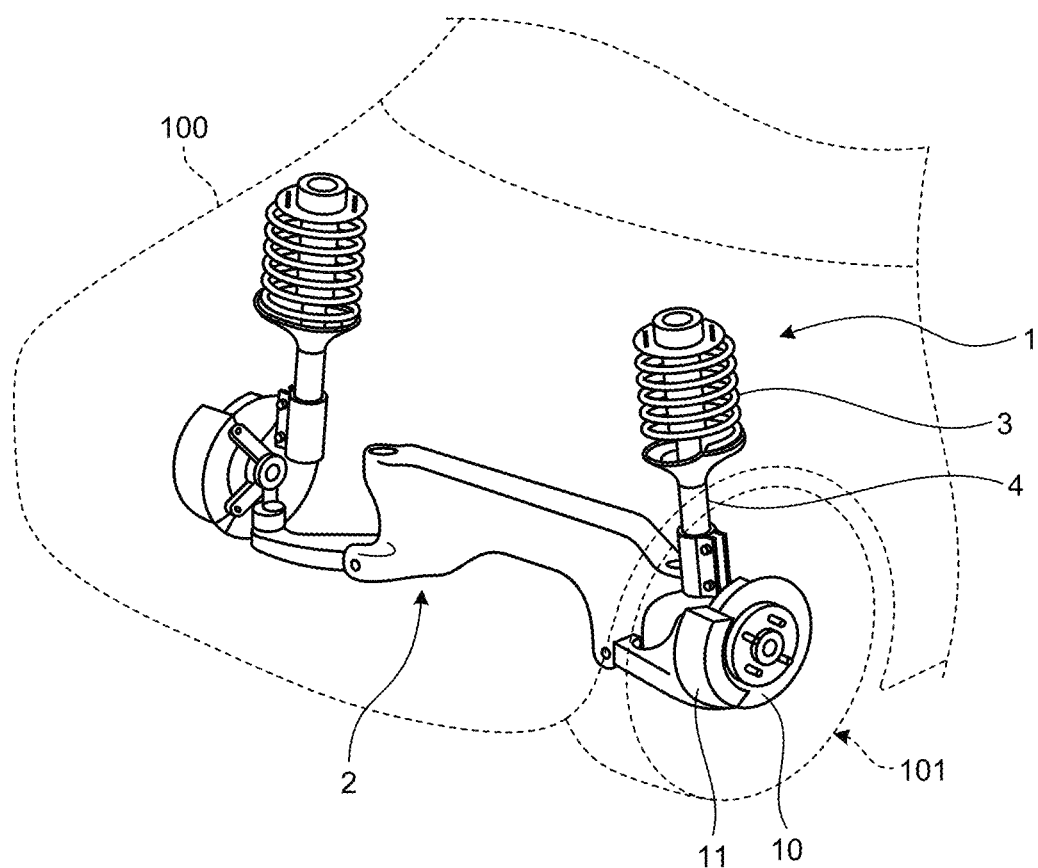
FIG. 1 is a perspective view schematically illustrating the configuration of a suspension in accordance with a first embodiment of the present invention.

FIG. 1 is a perspective view schematically illustrating the configuration of a suspension in accordance with a first embodiment of the present invention. A suspension 1 illustrated in FIG. 1 includes an arm unit 2 that is an arm unit forming an outline of the suspension 1 and rotatably supports two disc rotors 10 to which a tire 101 is attached, coil springs 3 (elastic member) that are expandable and contractable in a direction approximately perpendicular to a direction that the two disc rotors 10 face, and shock absorbers 4 that attenuate force (vibration) applied to an expansion and contraction operation of the coil springs 3. The disc rotors 10 are provided with calipers 11 capable of reducing the rotational speed of the disc rotors 10 by applying a load in a direction perpendicular to the rotational direction across the disc rotors 10. The suspension 1 is attached to a vehicle body 100, and absorbs vibration transmitted from the tire 101 depending on unevenness of a road surface.

Figure 2:
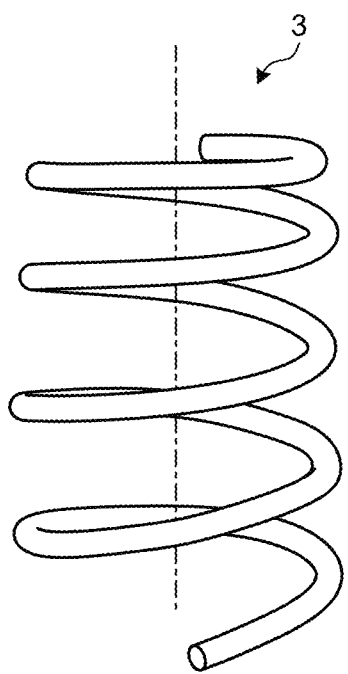
FIG. 2 is a perspective view schematically illustrating the configuration of a main part of the suspension in accordance with the first embodiment of the present invention.

FIG. 2 is a perspective view schematically illustrating the configuration of a main part of the suspension in accordance with the embodiment of the present invention, and is a perspective view illustrating the configuration of the coil spring 3. The coil spring 3 illustrated in FIG. 2 is formed of an aluminum (Al) alloy. The coil spring 3 is produced by spirally winding a wire rod that is approximately circular in cross-section using a flat surface perpendicular to a predetermined direction (for example, an extending direction of the wire rod) as a cutting surface. The coil spring 3 is expandable and contractable in a longitudinal direction (for example, a central axis direction indicated by a dashed line in FIG. 2). In the present specification, an aluminum alloy means an alloy mainly composed of aluminum.

An aluminum alloy forming the coil spring 3 includes 1.2% by mass to 4.0% by mass of copper (Cu), 4.0% by mass to 14.0% by mass of zinc (Zn), 0.5% by mass to 4.0% by mass of magnesium (Mg), 0.01% by mass or less of silicon (Si), and 0.01% by mass or less of iron (Fe), with the balance containing aluminum (Al) and inevitable impurities.

Preferably, the aluminum alloy includes at least one of: 0.7% by mass or less of manganese (Mn); 0.35% by mass or less of chromium (Cr); 0.25% by mass or less of zirconium (Zr); and 0.15% by mass or less of titanium (Ti).

The average equivalent circle crystal grain size of this aluminum alloy is 500 nm or less. In a process of producing a wire rod for producing the coil spring 3 from the aluminum alloy, shearing work is preferably applied. Applying shearing work enables the average equivalent circle crystal grain size to be made smaller.

The aluminum alloy has an average area ratio of a secondary-phase particle of 1% (including 0) or less.

The secondary-phase particle may be a crystallized material, a disperse particle, or a precipitate.

The crystallized material is an intermetallic compound including Al and Fe or Al and Si. When corresponding to 7,000 series aluminum alloy, the crystallized material is $Al_7Cu_2Fe$, $Al_6(Fe, Mn)$, $Al_{12}(Fe, Mn)_3Si$, $Mg_2Si$, $Al_2CuMg$, and the like.

The disperse particle is an intermetallic compound of transition metal Mn, Cr, and Zr, Al, and Cu, Zn, and Mg. When corresponding to a 7,000 series aluminum alloy, the disperse particle is $Al_{12}Mg_2Cr$, $Al_3Zr$, and the like.

The precipitate is an intermetallic compound of Al, and Cu, Zn, and Mg. When corresponding to a 7,000 series aluminum alloy, the precipitate is $MgZn_2$, $Mg(Zn, Cu, Al)_2$, and the like.

A maximum diameter of the secondary-phase particle in the aluminum alloy is 6 μm or less. In this case, the maximum diameter means a diameter when a particle is portrayed as a circle.

From a viewpoint of tensile characteristics, the aluminum alloy has preferably tensile strength of 780 MPa or more and breaking elongation of 12% or more.

From a viewpoint of corrosion characteristics, the aluminum alloy has preferably a maximum depth of a corrosion pit after a saltwater spray test based on JIS Z 2371 is executed for 48 hours of 60 μm or less.

In the first embodiment of the present invention described above, the coil spring 3 is produced by using the aluminum alloy that includes 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, and has an average equivalent circle crystal grain size of 500 nm or less. According to the first embodiment, in the coil spring 3, weight may be reduced by using an alloy mainly composed of aluminum, and also, high strength and elongation may be provided by forming the aluminum alloy of the composition described above.

Modification of First Embodiment

Figure 3:
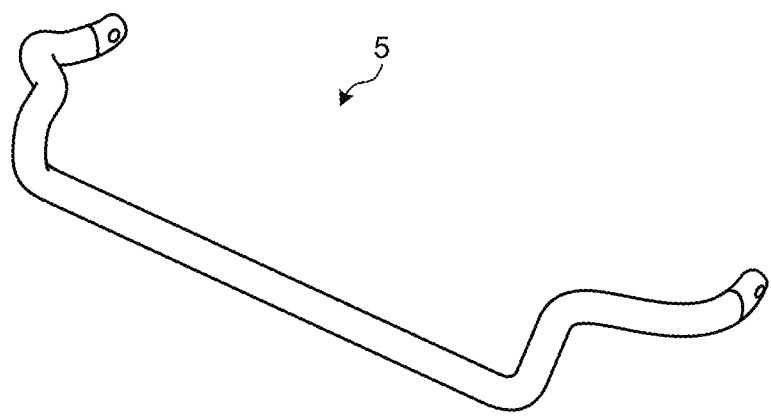
FIG. 3 is a perspective view schematically illustrating a spring member in accordance with a modification of the first embodiment of the present invention.

FIG. 3 is a perspective view schematically illustrating a spring member in accordance with a modification of the first embodiment of the present invention. In the first embodiment described above, explanation is made using the coil spring 3 for a suspension as an example, but, for example, a stabilizer 5 illustrated in FIG. 3 may be used. The stabilizer 5 may be produced by bending a wire rod formed of the aluminum alloy described above. The stabilizer 5 bends while expanding and contracting depending on an applied load (direction in which a load is applied).

Second Embodiment

Figure 4:
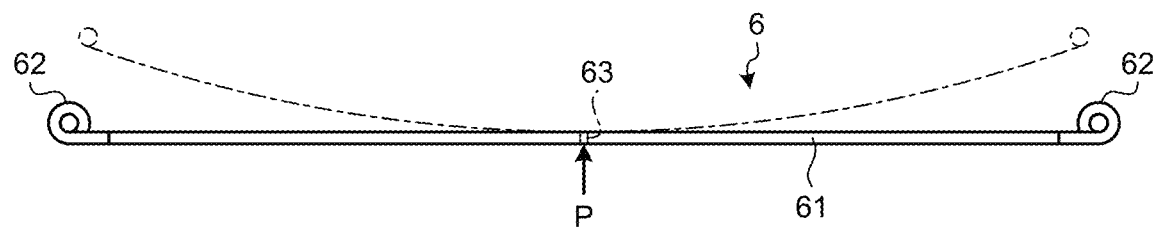
FIG. 4 is a side view illustrating the configuration of a leaf spring in accordance with a second embodiment of the present invention.

A second embodiment of the present invention will be described with reference to FIG. 4. FIG. 4 is a side view illustrating the configuration of a leaf spring in accordance with the second embodiment of the present invention. A leaf spring 6 is formed by deforming a member having a uniform plate thickness. The leaf spring 6 includes a spring main body 61, and a winding unit 62 that extends from each end part of the spring main body 61 and winds a member. In the central part of the spring main body 61, a hole 63 to which a component such as a bracket is attached is formed. This leaf spring 6 is formed in a curved shape indicated by a dashed line in FIG. 4, and a load is applied to the leaf spring 6 from an arrow P direction in FIG. 4 when the leaf spring 6 is used. FIG. 4 illustrates a state where the leaf spring 6 is deformed by having a load applied thereto from the arrow P direction. A member gradually becoming thinner from the center to an end part may be used for the leaf spring 6.

The leaf spring 6 is formed of the aluminum alloy described above. Specifically, the aluminum alloy includes 1.2% by mass to 4.0% by mass of copper (Cu), 4.0% by mass to 14.0% by mass of zinc (Zn), 0.5% by mass to 4.0% by mass of magnesium (Mg), 0.01% by mass or less of silicon (Si), and 0.01% by mass or less of iron (Fe), with the balance containing aluminum (Al) and inevitable impurities.

Preferably, the aluminum alloy includes at least one of 0.7% by mass or less of manganese (Mn), 0.35% by mass or less of chromium (Cr), 0.25% by mass or less of zirconium (Zr), and 0.15% by mass or less of titanium (Ti).

In addition, as for the average equivalent circle crystal grain size, the average area ratio of a secondary-phase particle, the maximum diameter of the secondary-phase particle, tensile characteristics, and corrosion characteristics, this aluminum alloy preferably satisfies at least one of the conditions described above. In a process of forming a member for producing the leaf spring 6 from the aluminum alloy, shearing work is preferably applied.

In the second embodiment of the present invention described above, a leaf spring 6 is produced by using the aluminum alloy that includes 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, and has an average equivalent circle crystal grain size of 500 nm or less. According to the second embodiment, in the leaf spring 6, weight may be reduced by using an alloy mainly composed of aluminum, and also, high strength and elongation may be provided by forming the aluminum alloy of the composition described above.

Third Embodiment

Figure 5:
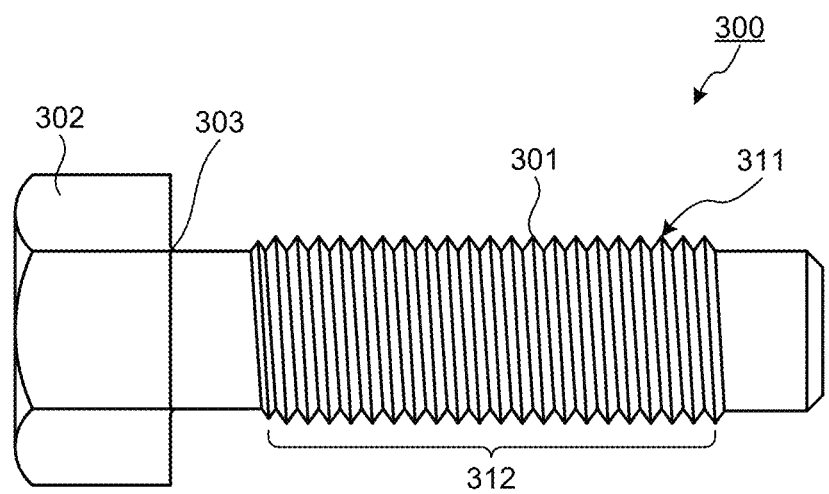
FIG. 5 is a side view illustrating the configuration of a fastening member in accordance with a third embodiment of the present invention.

FIG. 5 is a side view illustrating the configuration of a fastening member in accordance with a third embodiment of the present invention. A fastening member 300 illustrated in FIG. 5 is a bolt (one kind of male screws) formed of an aluminum (Al) alloy. The fastening member 300 includes an axis unit 301 formed into a cylindrical shape, a head part 302 provided at one end in an axial direction (horizontal direction in FIG. 5) of the axis unit 301, and a neck part 303 forming a boundary between the axis unit 301 and the head part 302. The axis unit 301 includes a screw unit 312 having a screw thread 311 formed thereon. The shape (hexagonal trim type) of the head part 302 is merely an example, and the head part 302 may have other shapes (a hexagonal flange type, a pan type, a dish type, a truss type, a flat type, and the like).

The fastening member 300 is formed of the aluminum alloy described above. Specifically, the aluminum alloy includes 1.2% by mass to 4.0% by mass of copper (Cu), 4.0% by mass to 14.0% by mass of zinc (Zn), 0.5% by mass to 4.0% by mass of magnesium (Mg), 0.01% by mass or less of silicon (Si), and 0.01% by mass or less of iron (Fe), with the balance containing aluminum (Al) and inevitable impurities.

Preferably, the aluminum alloy includes at least one of: 0.7% by mass or less of manganese (Mn); 0.35% by mass or less of chromium (Cr); 0.25% by mass or less of zirconium (Zr); and 0.15% by mass or less of titanium (Ti).

In addition, as for the average equivalent circle crystal grain size, the average area ratio of a secondary-phase particle, the maximum diameter of the secondary-phase particle, tensile characteristics, and corrosion characteristics, this aluminum alloy preferably satisfies at least one of the conditions described above. When strength and elongation satisfy the conditions described above as tensile characteristics, the fastening member 300 excellent in toughness may be obtained.

In a process of forming a rod-like member for producing the fastening member 300 from the aluminum alloy, shearing work is preferably applied.

In the third embodiment of the present invention described above, the fastening member 300 is produced by using the aluminum alloy that includes 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, and has an average equivalent circle crystal grain size of 500 nm or less. According to the third embodiment, in the fastening member 300, weight may be reduced by using an alloy mainly composed of aluminum, and also, high strength and elongation may be provided by forming the aluminum alloy of the composition described above.

Fourth Embodiment

Figure 6:
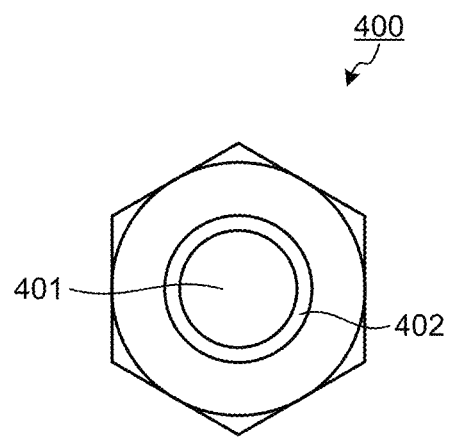
FIG. 6 is a plan view illustrating the configuration of a fastening member in accordance with a fourth embodiment of the present invention.

FIG. 6 is a plan view illustrating the configuration of a fastening member in accordance with a fourth embodiment of the present invention. A fastening member 400 illustrated in FIG. 6 is a nut (one kind of female screws) formed of the aluminum alloy described above. The fastening member 400 is formed into a hollow cylindrical shape, and has a screw thread 402 formed inside a hole 401 formed in the central part. The shape (hexagonal nut) of the fastening member 400 illustrated in FIG. 6 is merely an example, and may be implemented as a nut having other shapes (a nut with a flange, a hexagon cap nut, a high nut, and the like).

The fastening member 400 is formed using the aluminum alloy described above, and is formed into a ring shape. Specifically, the aluminum alloy includes 1.2% by mass to 4.0% by mass of copper (Cu), 4.0% by mass to 14.0% by mass of zinc (Zn), 0.5% by mass to 4.0% by mass of magnesium (Mg), 0.01% by mass or less of silicon (Si), and 0.01% by mass or less of iron (Fe), with the balance containing aluminum (Al) and inevitable impurities.

Preferably, the aluminum alloy includes at least one of: 0.7% by mass or less of manganese (Mn); 0.35% by mass or less of chromium (Cr); 0.25% by mass or less of zirconium (Zr); and 0.15% by mass or less of titanium (Ti).

In addition, as for the average equivalent circle crystal grain size, the average area ratio of a secondary-phase particle, the maximum diameter of the secondary-phase particle, tensile characteristics, and corrosion characteristics, this aluminum alloy preferably satisfies at least one of the conditions described above. When strength and elongation satisfy the conditions described above as tensile characteristics, the fastening member 400 excellent in toughness may be obtained.

In a process of forming a rod-like member for producing the fastening member 400 from the aluminum alloy, shearing work is preferably applied.

The fastening member 400 is formed by applying wire drawing processing, hollowing-out processing of the core part, header processing, and the like to a rod-like member formed of the aluminum alloy described above.

In the fourth embodiment of the present invention described above, the fastening member 400 is produced by using the aluminum alloy that includes 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, and has an average equivalent circle crystal grain size of 500 nm or less. According to the fourth embodiment, in the fastening member 400, weight may be reduced by using an alloy mainly composed of aluminum, and also, high strength and elongation may be provided by forming the aluminum alloy of the composition described above.

Fifth Embodiment

Figure 7:
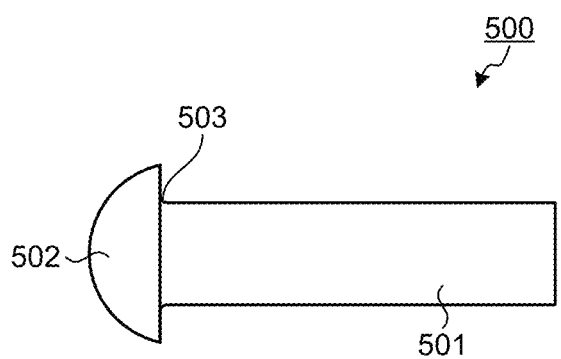
FIG. 7 is a side view illustrating the configuration of a fastening member in accordance with a fifth embodiment of the present invention.

FIG. 7 is a side view illustrating the configuration of a fastening member in accordance with a fifth embodiment of the present invention. A fastening member 500 illustrated in FIG. 7 is a rivet formed of the aluminum alloy described above. The fastening member 500 includes an axis unit 501 of a cylindrical shape, a head part 502 provided at one end in a height direction (horizontal direction in FIG. 7) of the circular cylinder forming the axis unit 501, and a neck part 503 forming a boundary between the axis unit 501 and the head part 502. The shape (round type) of the head part 502 illustrated in FIG. 7 is merely an example, and the head part 502 may have other shapes (dish type and the like).

The fastening member 500 is formed of the aluminum alloy described above. Specifically, the aluminum alloy includes 1.2% by mass to 4.0% by mass of copper (Cu), 4.0% by mass to 14.0% by mass of zinc (Zn), 0.5% by mass to 4.0% by mass of magnesium (Mg), 0.01% or less of silicon (Si), and 0.01% or less of iron (Fe), with the balance containing aluminum (Al) and inevitable impurities.

Preferably, the aluminum alloy includes at least one of: 0.7% by mass or less of manganese (Mn); 0.35% by mass or less of chromium (Cr); 0.25% by mass or less of zirconium (Zr); and 0.15% by mass or less of titanium (Ti).

In addition, as for the average equivalent circle crystal grain size, the average area ratio of a secondary-phase particle, the maximum diameter of the secondary-phase particle, tensile characteristics, durability, and corrosion characteristics, this aluminum alloy preferably satisfies at least one of the conditions described above. When strength and elongation satisfy the conditions described above as tensile characteristics, the fastening member 500 excellent in toughness may be obtained.

In a process of forming a rod-like member for producing the fastening member 500 from the aluminum alloy, shearing work is preferably applied.

The fastening member 500 may be formed by applying wire drawing processing, header processing, and the like to a rod-like member formed of the aluminum alloy described above.

In the fifth embodiment of the present invention described above, the fastening member 500 is produced by using the aluminum alloy that includes 1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, and has an average equivalent circle crystal grain size of 500 nm or less. According to the fifth embodiment, in the fastening member 500, weight may be reduced by using an alloy mainly composed of aluminum, and also, high strength and elongation may be provided by forming the aluminum alloy of the composition described above.

The embodiments for implementing the present invention have been described, but the present invention is not limited to only the first to the fifth embodiments described above. For example, the fastening members according to the third to the fifth embodiments may be implemented as machine screws and tapping screws that are male screws other than bolts.

In this manner, the present invention may include various embodiments and the like that are not described in this specification, and various kinds of design changes and the like may be made without departing from the technical ideas specified by the scope of the claims.

EXAMPLES

The following describes examples of the aluminum alloy according to the present invention. It should be noted that the present invention is not limited to these examples.

First and Second Examples, First to Fourth Comparative Examples

A test piece formed of an aluminum alloy of each composition illustrated in Table 1 was produced. Shearing work provided equivalent strain 10 to 30. In heat treatment, solution treatment was performed at 480° C., and after that, aging for holding an aluminum alloy at 120° C. for 24 hours was performed. In each test piece, the average crystal grain size, the secondary-phase particle area ratio, and the secondary-phase particle maximum diameter were obtained. In addition, a tensile characteristics test was applied to these test pieces so as to obtain tensile strength and breaking elongation. Furthermore, a corrosion resistance test was applied to each test piece. In the corrosion resistance test, a saltwater spray test based on JIS Z 2371 was executed for 48 hours. If a maximum depth of a corrosion pit after the execution was 60 μm or less, the result was defined as good (○). If the maximum depth is larger than 60 μm, the result was defined as not good (×). 30 corrosion pits were observed with respect to any cross-section of each test piece.

Table 1 indicates the composition, the calculation results, and the test results.

TABLE 1

| | Chemical composition (wt %) | | | | | | Enhancement method | Metal structure | | | Tensile characteristics | | Corrosion resistance |
|---|---|---|---|---|---|---|---|---|---|---|---|---|---|
| | | | | | | | | Average crystal grain size (nm) | Secondary-phase particle area ratio (%) | Secondary-phase particle maximum diameter (μm) | Tensile strength (MPa) | Breaking elongation (%) | |
| | Si | Fe | Cu | Mg | Zn | Al | | | | | | | |
| First practical example | 0.0033 | 0.0022 | 1.39 | 2.19 | 5.37 | Balance | Shearing work | 160 | 0.02 | 1.9 | 804 | 26 | ○ |
| Second practical example | 0.0014 | 0.0013 | 2.15 | 2.06 | 5.94 | Balance | Shearing work | 170 | 0.25 | 3.5 | 810 | 28 | ○ |
| First comparison example | 0.05 | 0.28 | 1.45 | 2.31 | 5.77 | Balance | Shearing work | 180 | 1.79 | 10.4 | 777 | 11 | ○ |
| Second comparison example | 0.05 | 0.28 | 1.45 | 2.31 | 5.77 | Balance | Heat treatment | 26,300 | 2.49 | 9.3 | 628 | 16 | x |
| Third comparison example | 0.04 | 0.08 | 2.2 | 2.2 | 6.3 | Balance | Shearing work | 170 | 1.91 | 9.0 | 899 | 11 | ○ |
| Fourth comparison example | 0.04 | 0.08 | 2.2 | 2.2 | 6.3 | Balance | Heat treatment | 21,900 | 4.67 | 18.3 | 513 | 13.5 | x |

First Example

A first example relates to an aluminum alloy that includes 0.0033% by mass of Si, 0.0022% by mass of Fe, 1.39% by mass of Cu, 2.19% by mass of Mg, and 5.37% by mass of Zn, with the balance containing aluminum (Al) and inevitable impurities. In addition, in the first example, shearing work is applied.

Second Example

A second example relates to an aluminum alloy that includes 0.0014% by mass of Si, 0.0013% by mass of Fe, 2.15% by mass of Cu, 2.06% by mass of Mg, and 5.94% by mass of Zn, with the balance containing aluminum (Al) and inevitable impurities. In addition, in the second example, shearing work is applied.

First Comparative Example

A first comparative example relates to an aluminum alloy that includes 0.05% by mass of Si, 0.28% by mass of Fe, 1.45% by mass of Cu, 2.31% by mass of Mg, and 5.77% by mass of Zn, with the balance containing aluminum (Al) and inevitable impurities. In the first comparative example, the content of each of Si and Fe is larger than 0.01% by mass. In addition, in the first comparative example, shearing work is applied.

Second Comparative Example

A second comparative example relates to an aluminum alloy that includes 0.05% by mass of Si, 0.28% by mass of Fe, 1.45% by mass of Cu, 2.31% by mass of Mg, and 5.77% by mass of Zn, with the balance containing aluminum (Al) and inevitable impurities. In the second comparative example, the content of each of Si and Fe is larger than 0.01% by mass. In addition, in the second comparative example, heat treatment is applied.

Third Comparative Example

A third comparative example relates to an aluminum alloy that includes 0.04% by mass of Si, 0.08% by mass of Fe, Cu of 2.2% by mass, 2.2% by mass of Mg, and 6.3% by mass of Zn, with the balance containing aluminum (Al) and inevitable impurities. In the third comparative example, the content of each of Si and Fe is larger than 0.01% by mass. In addition, in the third comparative example, shearing work is applied.

Fourth Comparative Example

A fourth comparative example relates to an aluminum alloy that includes 0.04% by mass of Si, 0.08% by mass of Fe, 2.2% by mass of Cu, 2.2% by mass of Mg, and 6.3% by mass of Zn, with the balance containing aluminum (Al) and inevitable impurities. In the fourth comparative example, the content of each of Si and Fe is larger than 0.01% by mass. In addition, in the fourth comparative example, heat treatment is applied.

The first and second examples have the average crystal grain size of 160 nm and 170 nm, respectively, and the average crystal grain size of both examples is 500 nm or less. By contrast, the second and fourth comparative examples have the average crystal grain size of 26,300 nm and 21,900 nm, respectively, and the average crystal grain size of both comparative examples is larger than 500 nm.

The first and second examples have the secondary-phase particle area ratio of 0.02% and 0.25%, respectively, and the secondary-phase particle area ratio of both examples is 1% or less. The first and second examples have the secondary-phase particle maximum diameters of 1.9 μm and 3.5 μm, respectively, and the secondary-phase particle maximum diameter of both examples is less than 6 μm.

By contrast, the second and fourth comparative examples have the secondary-phase particle area ratio of 2.49% and 4.67%, respectively, and the secondary-phase particle area ratio of both comparative examples is larger than 1%. The second and fourth comparative examples have the secondary-phase particle maximum diameters of 9.3 μm and 18.3 μm, respectively, and the secondary-phase particle maximum diameter of both comparative examples is larger than 6 μm.

From these results, the area ratio and the maximum diameter of a secondary-phase crystal particle when shearing work is applied may be smaller than those when heat treatment is applied.

Figure 8:
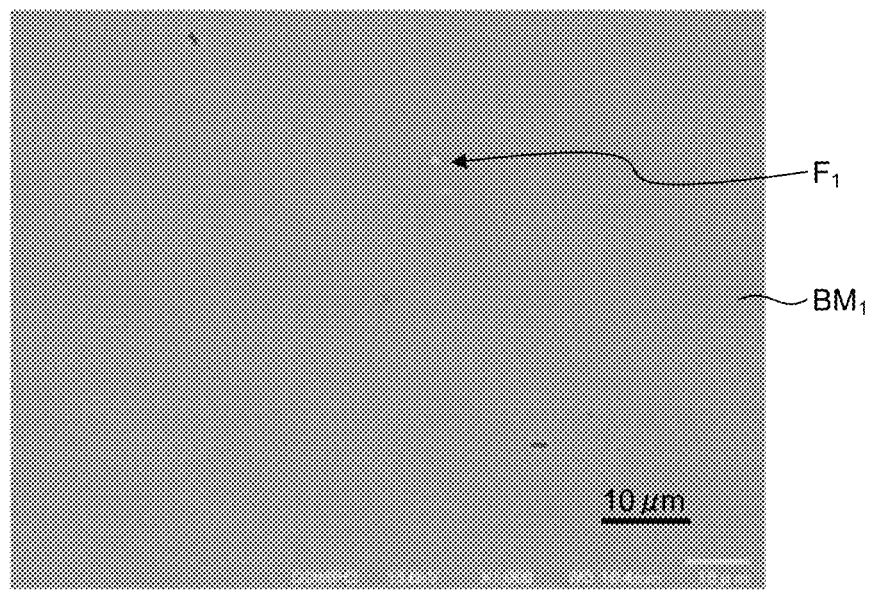
FIG. 8 is a view illustrating characteristics of an aluminum alloy in accordance with an example (first example) of the present invention.
Figure 9:
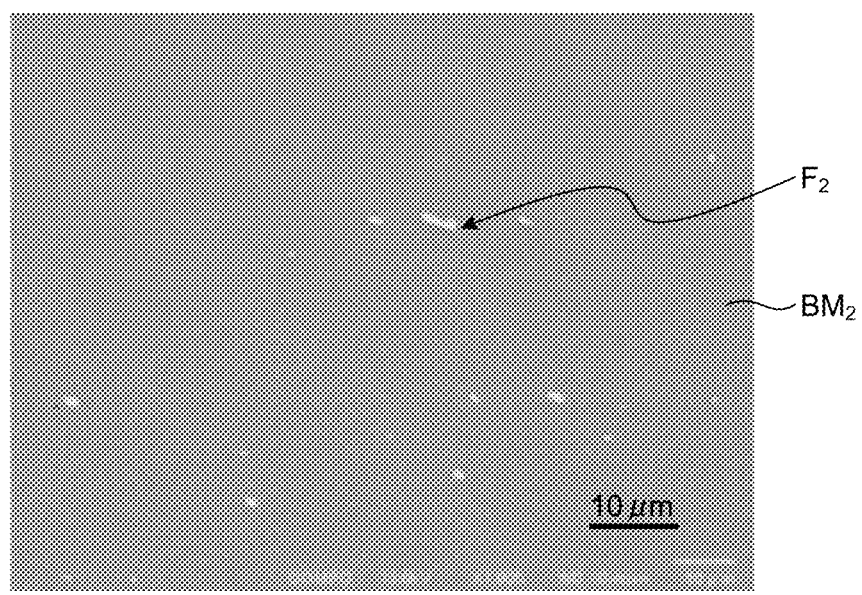
FIG. 9 is a view illustrating characteristics of an aluminum alloy in accordance with an example (second example) of the present invention.
Figure 10:
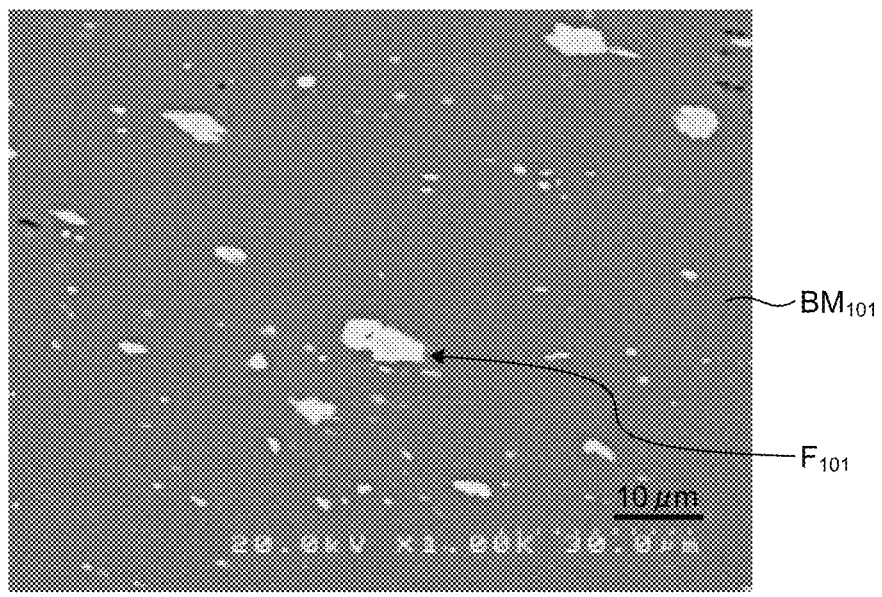
FIG. 10 is a view illustrating characteristics of an aluminum alloy in accordance with an example (first comparative example) of the present invention.
Figure 11:
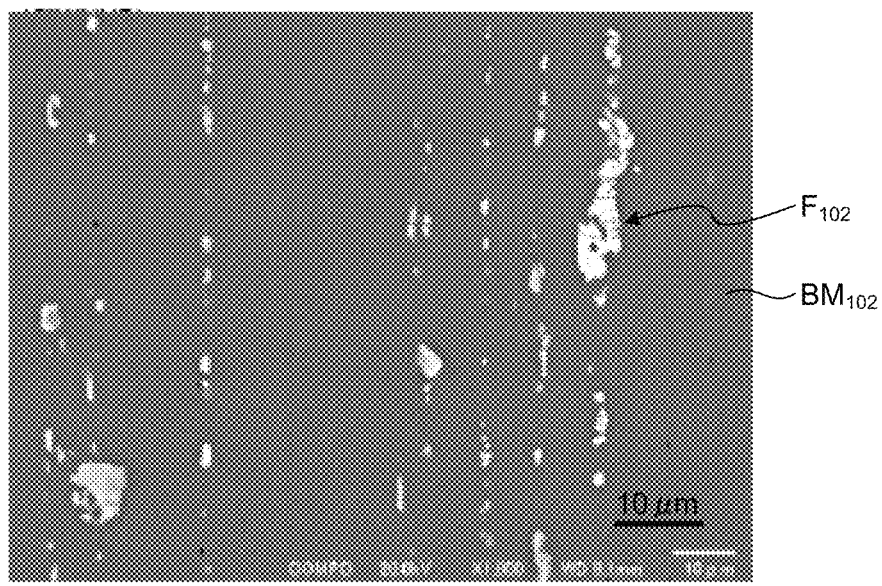
FIG. 11 is a view illustrating characteristics of an aluminum alloy in accordance with an example (second comparative example) of the present invention.
Figure 12:
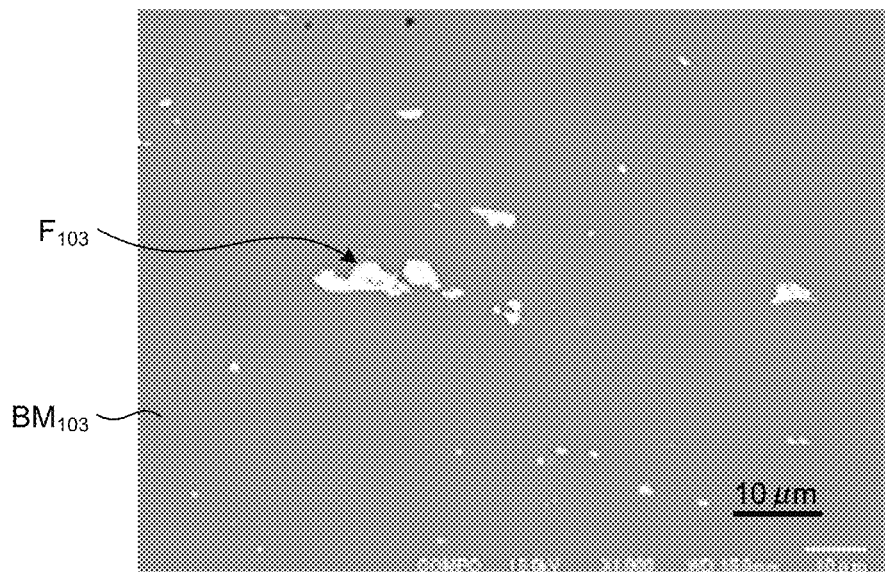
FIG. 12 is a view illustrating characteristics of an aluminum alloy in accordance with an example (third comparative example) of the present invention.
Figure 13:
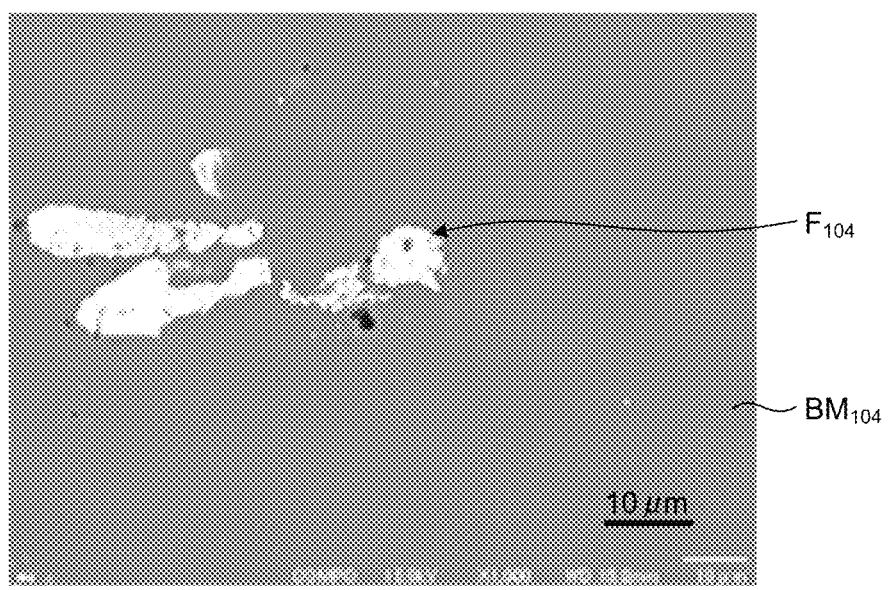
FIG. 13 is a view illustrating characteristics of an aluminum alloy in accordance with an example (fourth comparative example) of the present invention.

FIG. 8 is a view illustrating characteristics of the aluminum alloy in accordance with the example (first example) of the present invention. FIG. 9 is a view illustrating characteristics of the aluminum alloy in accordance with the example (second example) of the present invention. FIG. 10 is a view illustrating characteristics of the aluminum alloy in accordance with the example (first comparative example) of the present invention. FIG. 11 is a view illustrating characteristics of the aluminum alloy in accordance with the example (second comparative example) of the present invention. FIG. 12 is a view illustrating characteristics of the aluminum alloy in accordance with the example (third comparative example) of the present invention. FIG. 13 is a view illustrating characteristics of the aluminum alloy in accordance with the example (fourth comparative example) of the present invention.

As illustrated in FIGS. 8 to 13, it is found that the area occupied by secondary-phase particles $F_1$ and $F_2$ to base materials $BM_1$ and $BM_2$ and the maximum diameters of the secondary-phase particles $F_1$ and $F_2$ in the first and second examples are smaller than the area occupied by secondary-phase particles $F_{101}$ to $F_{104}$ to base materials $BM_{101}$ to $BM_{104}$ and the maximum diameters of the secondary-phase particles $F_{101}$ to $F_{104}$ in the first to fourth comparative examples.

From Table 1, the first and second examples have the tensile strength of 780 MPa or more. By contrast, the second and fourth comparative examples have the tensile strength of 628 MPa and 513 MPa, respectively, and the tensile strength of the second and fourth comparative examples is less than 780 MPa. In addition, from Table 1, the first and second examples have the breaking elongation of 12% or more. By contrast, the first and third comparative examples have the breaking elongation of 12% or less. From these results, it is found that the first and second examples satisfy the strength described above, and are also excellent in toughness.

In the corrosion resistance test, the first and second examples satisfy the conditions of corrosion resistance. By contrast, the maximum depth of a corrosion pit of the second and fourth comparative examples is larger than 60 μm, and the second and fourth comparative examples do not satisfy the conditions of corrosion resistance.

INDUSTRIAL APPLICABILITY

As described above, an aluminum alloy, a aluminum alloy spring, and a aluminum alloy fastening member according to the present invention are suitable for obtaining a member that has high strength and elongation while reducing weight.

REFERENCE SIGNS LIST

1 Suspension
2 Arm unit
3 Coil spring
4 Shock absorber
5 Stabilizer
6 Leaf spring
10 Disc rotor
11 Caliper
100 Vehicle body
101 Tire
300, 400, 500 Fastening member

The invention claimed is:
1. An aluminum alloy spring, comprising
an aluminum alloy comprising:
1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, wherein
the aluminum alloy has an average equivalent circle crystal grain size of 500 nm or less.
2. The aluminum alloy spring according to claim 1, wherein the aluminum alloy has tensile strength of 780 MPa or more and breaking elongation of 12% or more.
3. A method of manufacturing an aluminum alloy spring, the method comprising:
performing shearing work to an aluminum alloy comprising:
1.2% by mass to 4.0% by mass of copper, 4.0% by mass to 14.0% by mass of zinc, 0.5% by mass to 4.0% by mass of magnesium, 0.01% by mass or less of silicon, and 0.01% by mass or less of iron, with the balance containing aluminum and inevitable impurities, wherein
the aluminum alloy has an average equivalent circle crystal grain size of 500 nm or less;
and forming the aluminum alloy subjected to the shearing work into an aluminum alloy spring.
4. The method according to claim 3, wherein the aluminum alloy has tensile strength of 780 MPa or more and breaking elongation of 12% or more.

* * * * *